March 22, 1960   T. F. PETERSON   2,929,195
OVERSIZE HELICALLY-PREFORMED ARMOR FOR LINEAR BODIES
Filed Nov. 19, 1952   2 Sheets-Sheet 1
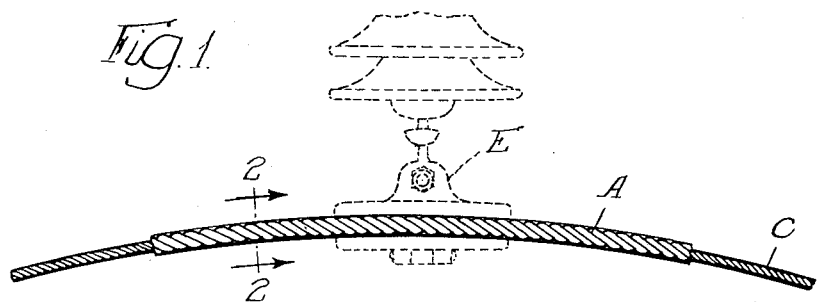
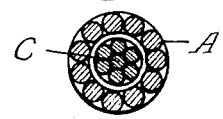
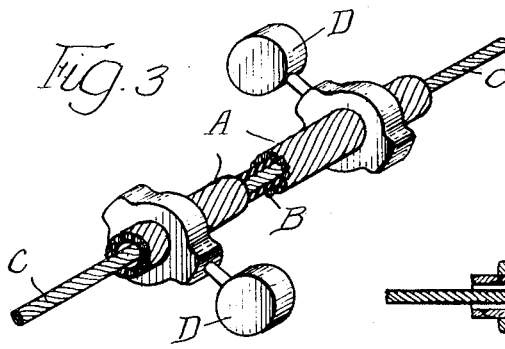
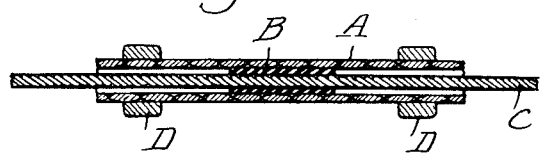
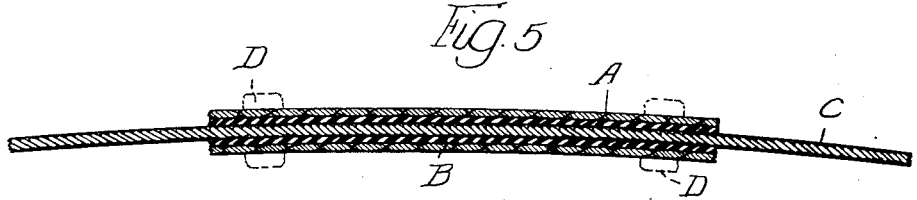
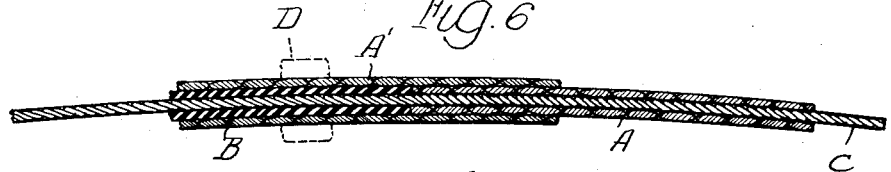
INVENTOR.
Thomas F. Peterson,
BY
Wilkinson, Huxley, Byron & Hume
Attys

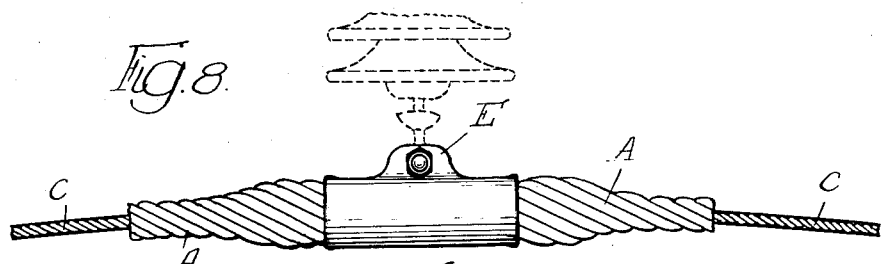
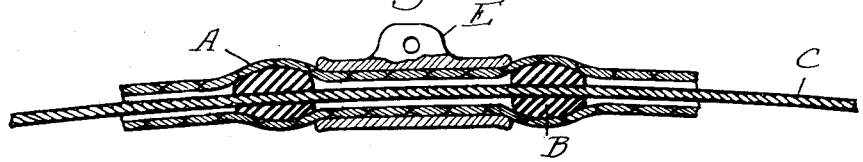
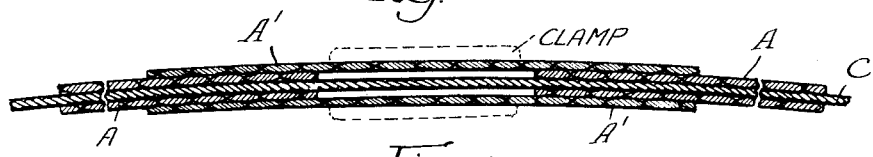
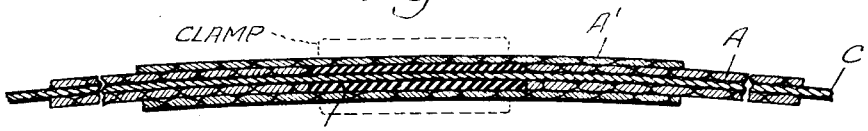
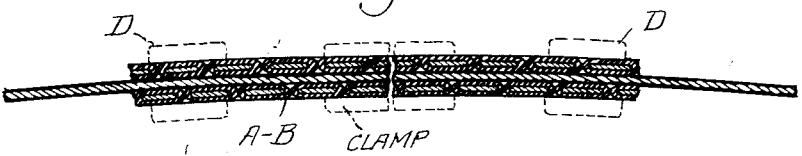
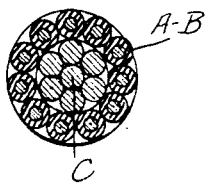
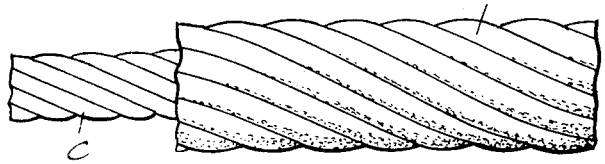

United States Patent Office 2,929,195
Patented Mar. 22, 1960

2,929,195

OVERSIZE HELICALLY-PREFORMED ARMOR FOR LINEAR BODIES

Thomas F. Peterson, Shaker Heights, Ohio, assignor to Preformed Line Products Company, Cleveland, Ohio, a corporation of Ohio Application November 19, 1952, Serial No. 321,426

14 Claims. (Cl. 57—146)

The present invention relates to the adaptation of helically-preformed armor rods for the reinforcement and gripping of wires, cables, and other stranded bodies, and for the attachment thereto of various instrumentalities, such as vibration dampers, in a way that will prevent any harmful concentrations of abrasion and crushing forces, as well as vibration stresses, from being brought to bear upon the stranded body.

In my application Serial No. 698,312, filed September 20, 1946, I have taught the manner in which helically-preformed armor rods of the type here under consideration may be formed by themselves into a hollow tube in which the several armor rods are mutually self-sustaining.

In most instances, as I have disclosed in my prior patents and applications, the helical armor rods are preformed with an internal helical diameter that is equal to, or less than, the overall diameter of the stranded body to which they are applied for the purpose of developing a gripping force by which the armor rods and stranded body are locked together against relatively axial movement.

In a more recent application, Serial No. 321,425, filed on November 19, 1952, now Patent No. 2,729,054, issued January 3, 1956, I have taught the provision of assembling rods around a stranded body in which the central portions of the assembled armor rods are enlarged to form a tubular member in spaced relation to the stranded body for the attachment of clamps, which, by virtue of the spacing, are prevented from exerting crushing forces upon the stranded body. In such an arrangement, however, it is intended that the armor rods at their terminal portions at each side of the enlarged central portion be of the normal diameter; that is to say, of an internal helical diameter equal to or slightly smaller than the overall diameter of the stranded body of application for the purpose of gripping the latter to maintain the central spaced tubular portion in fixed axial relation thereto.

The present invention is intended to combine certain features of both of the disclosures of my copending applications by utilizing a plurality of armor rods, which may comprise a complete tubular complement thereof, or a lesser amount, having an internal helical diameter that is greater than the stranded body around which they are disposed. In such an application, a stranded body, such as an electrical transmission line to which is applied an oversize tubular body of this kind, is clamped to a support, and the stranded body is draped through the tube in much the same manner as electrical conductors are passed over the rigid types of saddle bearings for like purposes.

There are some usages where restraint from axial movement is not essential, and in such installations it is sufficient that the oversize tubular support be provided to suspend the conductor in the absence of any clamping action. At other times, however, the restraint from axial movement is necessary. In either case, it is the purpose of the present invention to teach the application of helically-preformed armor rods to a wire or stranded body having an overall diameter that is less than the internal diameter of the helically-preformed reinforcements, together with the provision of means to prevent axial movement therebetween when this is desired without reduction in the helical internal diameter of the reinforcements.

For the most part, the invention provides for the attachment of clamps in the suspension of conductors or in the attachment of vibration dampers, so that, irrespective of the clamping force applied, the helically-preformed reinforcements, rather than the stranded body of application, will sustain the pressure. Furthermore, as a concomitant feature, the invention provides for the efficient damping of vibrations in suspended lines as an inherent advantage in the use of oversize reinforcements.

In the accompanying drawings—

Figure 1 represents a fragmentary side elevational view of a suspended stranded body which passes through a tubular reinforcement of a larger internal diameter than the outside diameter of the stranded body, to which reinforcement the clamping member of a suspension organization is attached.

Figure 2 is a cross-sectional view taken along line 2—2 of Figure 1, which in the concentric relationship of parts as shown represents an idealized cross-section. Actually, due to its weight, the stranded body would normally lie upon the bottom of the internal surface of the oversize reinforcements to provide an eccentric relationship unless plastic or elastic fillers are employed to maintain tthe concentricity.

Figure 3 is a fragmentary perspective view of a stranded body to which a plurality of oversize reinforcements have been applied, at the ends of which eccentric weight vibration dampers have been secured.

Figure 4 is a diagrammatic longitudinal mid-sectional view of the construction shown in Figure 3, illustrating how the helically-preformed reinforcements bear upon an annular internal plastic compression member for locking the tubular reinforcements to the stranded body.

Figure 5 is a diagrammatic view corresponding to Figure 4, showing the interposition of an elongated plastic rubber-like tube between the helically-preformed reinforcements and the stranded body.

Figure 6 is a further adaptation of the invention illustrated in Figures 4 and 5, showing the application of two sets of helically-preformed armor rods of different diameters used in conjunction with a plastic tube.

Figure 7 is an enlarged fragmentary view of one helically-preformed armor rod provided with a plastic or rubber-like covering.

Figure 8 is a fragmentary side elevational view of a further adaptation of the invention employing plastic fillers in spaced relation between the reinforcements and the stranded body to provide axial thrust bearings for engagement with a central suspending clamp.

Figure 9 is a schematic longitudinal mid-sectional view of the device shown in Figure 8.

Figures 10 and 11 are further modifications of the invention disclosed in Figures 6 and 9.

Figures 12, 13 and 14 are a longitudinal mid-sectional view; an enlarged fragmentary side elevational view; and a cross-sectional view, also enlarged; respectively.

As has been fully treated in my prior patents and copending applications, helically-preformed armor rods are composed of round or shaped wire or plastic material of sufficient strength and rigidity to sustain a stranded body, such as an electrical transmission line, at its supports, without concentration of bending stresses, and with certain vibration dampening characteristics which inhere in the stranded construction. They are formed to a sufficiently open pitch to be applied to the stranded bodies from the side of the latter without exceeding the elastic limit of the materials of which they are formed, and without regard to the availability of the free end of the stranded body for threading therethrough.

Whereas, in this description and in the accompanying drawings, the term "stranded body" has been employed as a term most likely to embrace the average constructions, it should be noted that the invention is in no sense limited to the use merely on such bodies, but is applicable as well to a plain wire, or to any of the many forms of jacketed cables, such, for example, as a plastic jacketed telephone cable. Therefore, the reference to the "stranded body C" throughout the specification and claims should be read with this qualification in mind.

In Figure 1, a plurality of helically-preformed reinforcements A have been wrapped around the stranded body C so as to provide a tube of greater internal diameter than the overall diameter of the stranded body in surrounding relation to the latter, to which a suspension clamp E is applied. The oversize tube A prevents any crushing forces, which might otherwise arise upon application of the clamp E, from being exerted upon the stranded body C, while the latter is festooned through the tube at the support in such a way that bending stresses are minimized by the reinforcement, and vibrational tendencies are absorbed thereby.

The clearance between the stranded body C and the reinforcing tube A is illustrated in Figure 2. Such an application is sufficient where axial movement of the stranded body is of no consideration. Where, however, it is desirable to clamp the two together, as is frequently desirable in the application of vibrational dampers, and as is necessary to restrain the axial movement of the stranded body through the clamping means, it is a feature of the present invention to interpose resilient rubber-like fillers, hereinafter sometimes referred to as "plastic tubular elements" or "plastic tubes" or "members," which may come in half sections for easy installation, or may be made helically as disclosed in my Patent No. 2,275,019, around the stranded body between the latter and the helical reinforcements. In such case, the outside diameter of the tubular plastic fillers substantially agrees with, or is slightly larger than, the internal diameter of the helically-preformed reinforcements which are applied thereover, as appears in Figures 3 and 4. The helically-preformed reinforcements compress the plastic member into engagement with the stranded body, and thus effectually lock the two together. In this embodiment, the ends of the helically-preformed reinforcements are left free to move in directions radially and circumferentially of the stranded conductor so as to be effective as vibration damping means.

In augmentation of the latter function, eccentric weight clamping means D of familiar design are clamped to certain portions of the tubular reinforcements A, as appears in Figures 3 and 4, so as to enhance the torque inertia thereof in fulfillment of the vibration damping function. Suitable clamping means may be applied at the middle portion of this installation, in which case the armor rods A and the resilient filler B absorb the compressive stresses without damage to the stranded body C.

In Figure 5 a further adaptation is shown, in which the plastic tubular member B is first positioned in surrounding relation to a stranded body or conductor C. Two or more helically-preformed reinforcements A are then wrapped in surrounding relation to the plastic body, and clamping means D, either for purpose of suspension at an intermediate point of assembly, or for securing vibration dampers, are then applied thereto. In this case the tubular reinforcement A and the tubular plastic member B, filling the space which would otherwise exist between the stranded body and the reinforcement, absorb the compressive stresses which attend the application of the clamps thereto.

In Figure 6 the stranded body C is provided with a plurality of helically-preformed reinforcements A, which in this instance are fashioned after the manner taught previously by me in my patents and pending applications, to have an internal diameter equal to, or less than, that of the stranded body C, and adjacent to which, in abutting relation, also in surrounding relation to the stranded body, is applied a plastic tube B of substantially the same overall dimensions as the helically-preformed reinforcements A. Then a second set of helically-preformed reinforcements A', of an internal diameter equal to, or less than, the external diameter of the first applied helically-preformed reinforcements A and of the external diameter of the plastic tube B, is applied in overlapping relation to each, so as to provide a concentric layer of armor rods in spaced relation to the conductor for the application of clamping devices D, such as vibration dampers, similar to those shown in Figure 3.

In Figures 8 and 9, there is illustrated a further application of this principle, wherein the stranded body is surrounded by two spaced plastic members B, over which an oversize tube of helically-preformed reinforcements is applied. In this embodiment, even though the reinforcements are larger in internal diameter than the stranded body, they are somewhat smaller than the outside diameter of the plastic members B, which latter expand the armor rods so as to form spaced bumps axially of the armored assembly.

It will be noted that the armor between the bumps, as appears in Figure 9, is maintained in spaced relation to the stranded body C, so that when a clamp E for suspending or attachment purposes is applied thereto, it may be set up with suitable force to cause the compression of the armoring between the bumps without engaging the stranded body, while at the same time effecting the axial retention of the latter by virtue of the bearing of the bumps upon the clamp E. Except as to the oversize rods, this arrangement bears similarity to the disclosure in my copending application Serial No. 89,986, filed April 27, 1949. Likewise, the method of applying armor rods by the "skip-pitch" method which is disclosed and discussed in my copending application Serial No. 230,592, filed June 8, 1951, now Patent No. 2,722,393, issued November 1, 1955, may be adapted to the oversize reinforcement of the present invention in the formation of spaced bumps coaxially of the conductor.

In Figure 10, there is illustrated a conductor or other line C reinforced by two or more groups of regular size helically-preformed reinforcements A, between which a considerable space is allowed, which grip the line in the usual way. Bridging the two sets of reinforcements A, there is applied in overlapping relation to each an additional set of helically-preformed armor rods A', the latter having an internal diameter slightly smaller than the external diameter of the reinforcements A, so as to firmly grip the latter and to provide an enclosed space therebetween for the engagement of a clamp. As an alternative construction, the space between the two sets of axially spaced armor rods A may be filled by a tubular plastic member B, as appears in Figure 11. In either case, clamping forces applied intermediately of the assembly are dissipated in the space or in the plastic member without damage to the conductor or other line body to which they are applied.

There appears in Figure 7 an enlarged fragmentary view of a helically-preformed armor rod to which a plastic covering has been applied. These devices may be used as appears in Figures 12, 13 and 14, wherein the conductor or other line body C is surrounded by two or more helically-preformed reinforcements having the plastic covering as shown in Figure 7. Such plastic coverings serve, instead of the usual spacing of the plastic tubes described in connection with the preceding embodiments, for the absorption of crushing stresses which might be brought to bear in the application of clamps.

A preferred method of producing armor rods coated with plastic in accordance with this invention is to heat the preformed helices to an appropriate temperature and then dip them into a vinyl resin compound, one example of which is available on the market under the commercial name of "Plastisol." A predetermined amount of resin adheres to the helically-preformed armor rod, which is then cured at a heat of about 350° F. Other embodiments include the application of neoprene or natural rubber, which may be applied or vulcanized to the rods in accordance with established practices.

It is not necessary that complete tubes be formed of armor rods to give effect to the present invention. Rather it is contemplated that less than a full set of armor rods be applied, especially in those embodiments wherein plastic tubular inserts are used. In the latter case, only a sufficient number of rods need be applied in balanced or symmetrical relation to the assembly as regarded in cross-section to lend the necessary strength and rigidity, and to afford the necessary bearing surface for the clamps. It is also intended that the armor rods be of the same length or of different lengths, and in the latter case, certain of the rods may be extended to various points of termination axially of the conductor or other body of application so as to provide a feathering-out of the reinforcing function.

I claim:

1. Construction for engaging wires, cables, stranded bodies, and the like, comprising a plurality of helically-preformed reinforcements of mutually conforming open pitch and hand of lay, said reinforcements being of short length relative to the body of association for application thereto and removal therefrom in the field, and being manually applied in surrounding relation to such body so as to form an envelope of limited longitudinal extent therearound whose internal diameter is greater than the outside diameter of said body, and clamping means tightly gripping the external surfaces of said reinforcements.

2. The invention of claim 1, in which the clearance between said envelope and body is substantial, and in which space there is disposed an annular plastic member compressed between said reinforcements and body.

3. The invention of claim 2, in which said clamping means engage said reinforcements at positions overlying said plastic member.

4. The invention of claim 2, in which said plastic member and said envelope are substantially coextensive.

5. The invention of claim 2, in which said plastic member is one of two disposed in spaced relation coaxially of said body, said clamping means engaging said envelope exteriorly thereof between said spaced members.

6. The invention of claim 5, in which said spaced plastic members are substantially larger in outside diameter than the internal diameter of said reinforcements, whereby the latter are expanded to form armored protuberances in spaced relation axially of the assembly, said clamping means engaging said reinforcements between said protuberances.

7. In combination with a line body, a pair of helically-preformed relatively short armor rod tubes in spaced relation axially of said body surrounding the latter in tightly gripping relation, the internal diameter of said armor rods being less than the outside diameter of said body, another helically-preformed armor rod tube having an internal diameter equal to the external diameters of said pair of tubes surrounding the latter in overlapping engagement, and a clamp applied around said last tube intermediately of said pair of tubes.

8. The invention of claim 7, in which the space between said pair of tubes and between said last tube and the line body contains a plastic filler substance under compression.

9. Helically-preformed reinforcements having a coating of plastic substance uniformly applied thereto, said reinforcements being applied in hugging relation to a linear body, and a clamping means engaging the external surfaces of said reinforcements.

10. A vibration damper for suspended line bodies which comprises helically-preformed means of open pitch having an internal helical diameter substantially greater than the external diameter of the line body of application and being of finite length so as to be coextensive with but a fractional part of the longitudinal extent of said line body.

11. The invention of claim 10, said means being coated with a protective covering.

12. Construction for engaging wires, cables, stranded bodies, and the like, comprising a plurality of helically-preformed reinforcements of mutually conforming open pitch and hand of lay, said reinforcements being of short lengths relative to the body of association for application thereto and removal therefrom, and being manually applied in surrounding relation to such body so as to form an envelope of limited longitudinal extent therearound whose internal diameter is greater than the outside diameter of said body to provide a substantial space therebetween, an annular plastic member disposed centrally of said space in compressed condition between said reinforcements and cable, and clamping means comprising a pair of eccentric vibration damper weights engaged upon said envelope adjacent its opposite ends.

13. An appliance for damping vibrations in suspended cable-like bodies, comprising a first helix in tightly gripping relation to a cable, said helix having an open pitch for application to the cable from its side without exceeding the elastic limit of the material of which the helix is made, and a second helix cantilevered from said first helix in fixed relation thereto, said second helix having an internal diameter substantially greater than the external diameter of said cable, but also of an open pitch for side application to the latter within the elastic limit of the material of which the second helix is made.

14. The invention of claim 13, at least one of said helices at its external surfaces being composed of resilient plastic material.

References Cited in the file of this patent

UNITED STATES PATENTS

| | | |
|---|---|---|
| 337,513 | Moxham | Mar. 9, 1886 |
| 400,970 | Thompson | Apr. 9, 1889 |
| 817,328 | Lloyd | Apr. 10, 1906 |
| 1,873,798 | Varney | Aug. 23, 1932 |
| 1,884,036 | Malone | Oct. 25, 1932 |
| 2,037,506 | Ensinger | Apr. 14, 1936 |
| 2,275,019 | Peterson | Mar. 3, 1942 |
| 2,414,136 | Bodendieck | Jan. 14, 1947 |
| 2,509,894 | Toulmin | May 30, 1950 |
| 2,582,797 | Runde | Jan. 15, 1952 |
| 2,587,521 | Peterson | Feb. 26, 1952 |
| 2,604,509 | Blanchard | July 22, 1952 |